United States Patent
Shu

(10) Patent No.: US 9,407,810 B2
(45) Date of Patent: Aug. 2, 2016

(54) FOCUS DETECTION APPARATUS AND CONTROL METHOD THEREOF TO CONTROL ACCUMULATION TIME OF THE FOCUS DETECTION SENSORS

(71) Applicant: CANON KABUSHIKI KAISHA, Tokyo (JP)

(72) Inventor: Takayuki Shu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 14/162,941

(22) Filed: Jan. 24, 2014

(65) Prior Publication Data

US 2014/0218596 A1    Aug. 7, 2014

(30) Foreign Application Priority Data

Feb. 6, 2013    (JP) ................... 2013-021797

(51) Int. Cl.
*H04N 5/232*    (2006.01)
*G02B 7/34*    (2006.01)
*G03B 13/36*    (2006.01)
*G03B 19/12*    (2006.01)

(52) U.S. Cl.
CPC .............. *H04N 5/23212* (2013.01); *G02B 7/34* (2013.01); *G03B 13/36* (2013.01); *G03B 19/12* (2013.01)

(58) Field of Classification Search
None
See application file for complete search history.

(56) References Cited

U.S. PATENT DOCUMENTS

| | | | | |
|---|---|---|---|---|
| 2006/0177210 A1* | 8/2006 | Ichimiya | ................... | G02B 7/34 396/96 |
| 2008/0240699 A1* | 10/2008 | Ichimiya | ................... | G02B 7/34 396/96 |
| 2011/0052168 A1* | 3/2011 | Sakaguchi | ............. | G03B 13/32 396/96 |
| 2011/0052169 A1* | 3/2011 | Arita | ...................... | G03B 13/34 396/121 |
| 2011/0176794 A1* | 7/2011 | Ichimiya | .................. | G02B 7/28 396/123 |
| 2011/0262123 A1* | 10/2011 | Ichimiya | .................. | G02B 7/28 396/104 |
| 2012/0044397 A1* | 2/2012 | Isobe | ................... | G02B 27/646 348/298 |
| 2013/0038778 A1* | 2/2013 | Ichimiya | ............ | H04N 5/23212 348/349 |
| 2014/0063328 A1* | 3/2014 | Ichimiya | ............ | H04N 5/23212 348/349 |
| 2014/0253787 A1* | 9/2014 | Shu | ..................... | H04N 5/23212 348/353 |
| 2015/0271385 A1* | 9/2015 | Shu | ..................... | H04N 5/23212 348/297 |
| 2015/0281557 A1* | 10/2015 | Hirosawa | ........... | H04N 5/23212 348/208.12 |

FOREIGN PATENT DOCUMENTS

JP    2001-177756 A    6/2001
JP    2003-222786 A    8/2003

* cited by examiner

*Primary Examiner* — Shahbaz Nazrul
(74) *Attorney, Agent, or Firm* — Cowan, Liebowitz & Latman, P.C.

(57) ABSTRACT

A focus detection apparatus comprises a sensor unit including a first sensor and a second sensor and configured to output a signal for focus detection, each of the first sensor and the second sensor being configured to receive light that has passed through an imaging optical system and accumulate electric charges, a first signal generation unit configured to generate a first signal based on a contrast of a signal corresponding to the electric charges accumulated in the first sensor, a second signal generation unit configured to generate a second signal based on a contrast of a signal corresponding to the electric charges accumulated in the second sensor; and a control unit configured to control an accumulation time of the electric charges in the first sensor and the second sensor.

22 Claims, 19 Drawing Sheets

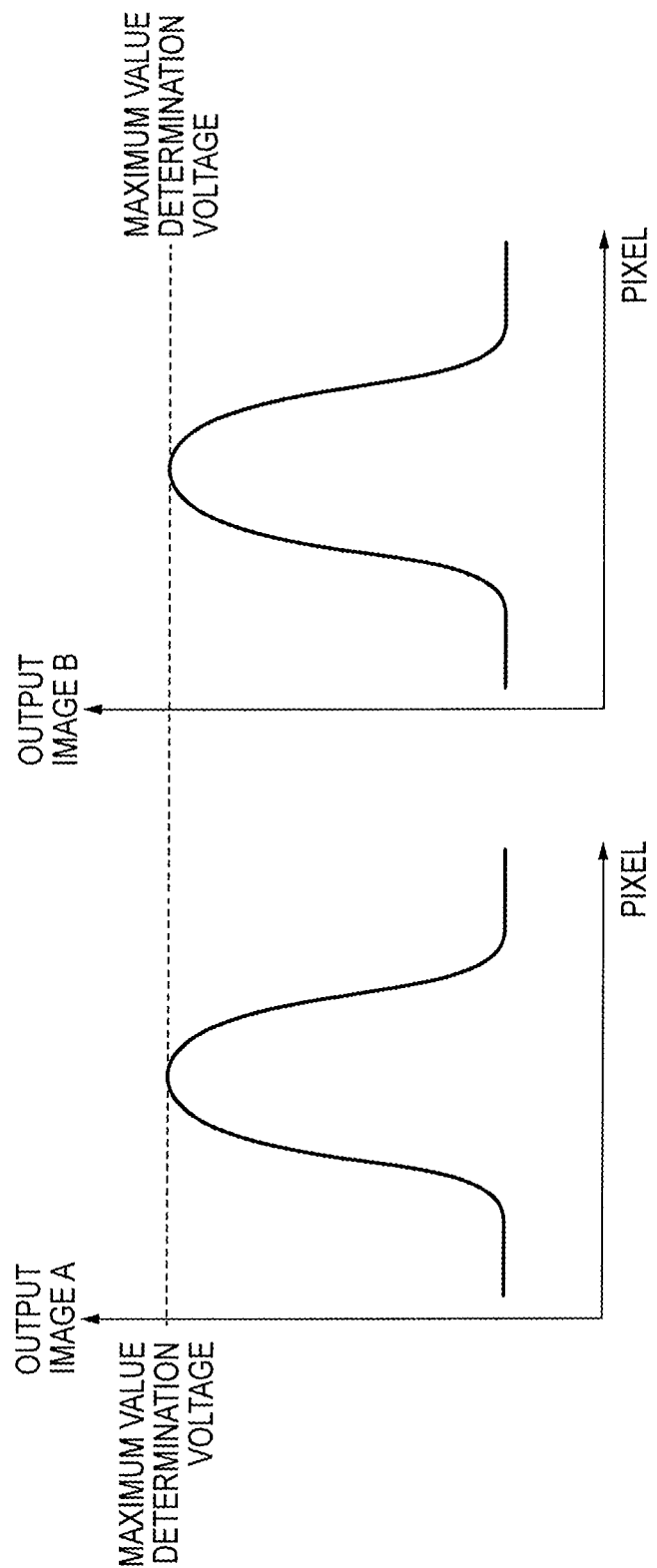

FOCUS DETECTION APPARATUS AND CONTROL METHOD THEREOF TO CONTROL ACCUMULATION TIME OF THE FOCUS DETECTION SENSORS

BACKGROUND OF THE INVENTION

1. Field of the Invention

The present invention relates to a focus detection apparatus and a control method thereof.

2. Description of the Related Art

Conventionally, a phase difference detection method is generally known well as the automatic focus detection method of a camera. In the phase difference detection method, the images of light beams from an object, which have passed through different exit pupil regions of an imaging lens, are formed on a pair of line sensors provided on an AF sensor. The relative position (phase difference) between a pair of object images obtained by photo-electric conversion of the pair of line sensors is calculated, thereby detecting the defocus amount of the imaging lens (AF calculation).

In such a focus detection apparatus, the number of photo-electric conversion units for acquiring focus detection images recently tends to increase to attain a multipoint configuration or a high resolution in detecting the defocus amount with respect to a plurality of objects. On the other hand, along with the increase in the number of photo-electric conversion units, it is becoming very difficult to completely eliminate defects in the manufacture.

There are known following literatures in association with the automatic focus detection technique using the phase difference detection method. For example, Japanese Patent Laid-Open No. 2003-222786 discloses an AF sensor according to related art which controls accumulation based on the maximum value signal of line sensor signals. In addition, Japanese Patent Laid-Open No. 2001-177756 discloses a technique of obtaining signals for focus detection while excluding the signals of defective photo-electric conversion units based on the information of defective pixels checked in the manufacturing step in advance.

In the technique disclosed in Japanese Patent Laid-Open No. 2003-222786, however, if a photo-electric conversion pixel of the line sensor is defective, electric charge accumulation ends without obtaining a sufficient object image signal.

This will be described below in more detail. One of object images formed on a pair of line sensors is defined as an image A, and the other as an image B. FIGS. 18A and 18B show an example of signals obtained from the object images when no defective pixel exists. When the output signal reaches the maximum value determination voltage, accumulation termination determination is performed, and the accumulation period ends. On the other hand, FIGS. 19A to 19C show an example of waveforms in a dark state when a defective pixel exists. The increase in the signal caused by the dark current of the defective pixel is larger as compared to a normal pixel. FIG. 20 shows accumulation control performed for the same object as in FIGS. 18A and 18B using the maximum value signal when a defective pixel as shown in FIGS. 19A to 19C exists. Since accumulation termination determination is done by the defective pixel signal that has reached the maximum value, the accumulation period ends before the signal amount to be originally obtained is accumulated. For this reason, the object signals shown in FIGS. 18A and 18B change to those in FIGS. 9A and 9B. As a result, no sufficient signal amount can be obtained, the S/N ratio of the signal lowers, and the accuracy of focus detection calculation lowers.

As disclosed in Japanese Patent Laid-Open No. 2001-177756 described above, accumulation control may be done while excluding the signals of defective photo-electric conversion units based on the information of defective pixels checked in the manufacturing step in advance. However, this method has no effect on unknown defects that have occurred after the check in the manufacturing step.

SUMMARY OF THE INVENTION

The present invention has been made in consideration of the above-described problems, and reduces the influence of defective pixels in accumulation control of an AF sensor in a focus detection apparatus.

According to the first aspect of the present invention, there is provided a focus detection apparatus comprising: a sensor unit including a first sensor and a second sensor and configured to output a signal for focus detection using a phase difference detection method, each of the first sensor and the second sensor being configured to receive light that has passed through an imaging optical system and accumulate electric charges; a first signal generation unit configured to generate a first signal based on a contrast of a signal corresponding to the electric charges accumulated in the first sensor; a second signal generation unit configured to generate a second signal based on a contrast of a signal corresponding to the electric charges accumulated in the second sensor; and a control unit configured to control an accumulation time of the electric charges in the first sensor and the second sensor based on signal levels of the first signal and the second signal.

According to the second aspect of the present invention, there is provided a focus detection apparatus comprising: a sensor unit including a first sensor and a second sensor and configured to output a signal for focus detection using a phase difference detection method, each of the first sensor and the second sensor being configured to receive light that has passed through an imaging optical system and accumulate electric charges; a third signal generation unit configured to generate a third signal based on maximum values of signals corresponding to the electric charges accumulated in the first sensor and the second sensor; a fourth signal generation unit configured to generate a fourth signal based on minimum values of the signals corresponding to the electric charges accumulated in the first sensor and the second sensor; a fifth signal generation unit configured to generate a fifth signal based on the third signal and the fourth signal; and a control unit configured to control an accumulation time of the electric charges in the first sensor and the second sensor based on a signal level of the fifth signal.

According to the third aspect of the present invention, there is provided a focus detection apparatus comprising: a sensor unit including a first sensor and a second sensor and configured to output a signal for focus detection using a phase difference detection method, each of the first sensor and the second sensor being configured to receive light that has passed through an imaging optical system and accumulate electric charges; a sixth signal generation unit configured to generate a sixth signal based on a contrast of a signal input in one of a first mode and a second mode; and a control unit configured to control an accumulation time of the electric charges in the first sensor and the second sensor based on a signal level of the sixth signal, wherein the sixth signal generation unit can switch between input of a first image signal corresponding to the electric charges accumulated in the first sensor and input of a second image signal corresponding to the electric charges accumulated in the second sensor, and the sixth signal generation unit generates the sixth signal from a signal obtained by compositing the first image signal and the second image signal in the first mode, and the sixth signal generation unit generates the sixth signal from one of the first image signal and the second image signal in the second mode.

According to the fourth aspect of the present invention, there is provided a method of controlling a focus detection apparatus constituted by arranging a sensor unit including a first sensor and a second sensor and configured to output a signal for focus detection using a phase difference detection method, each of the first sensor and the second sensor being configured to receive light that has passed through an imaging optical system and accumulate electric charges, the method comprising: a first signal generation step of generating a first signal based on a contrast of a signal corresponding to the electric charges accumulated in the first sensor; a second signal generation step of generating a second signal based on a contrast of a signal corresponding to the electric charges accumulated in the second sensor; and a control step of controlling an accumulation time of the electric charges in the first sensor and the second sensor based on signal levels of the first signal and the second signal.

Further features of the present invention will become apparent from the following description of exemplary embodiments with reference to the attached drawings.

BRIEF DESCRIPTION OF THE DRAWINGS

FIGS. 18A and 18B are graphs showing signals generated from object images;

DESCRIPTION OF THE EMBODIMENTS

The embodiments of the present invention will now be described in detail with reference to the accompanying drawings.

First Embodiment

Figure 1:
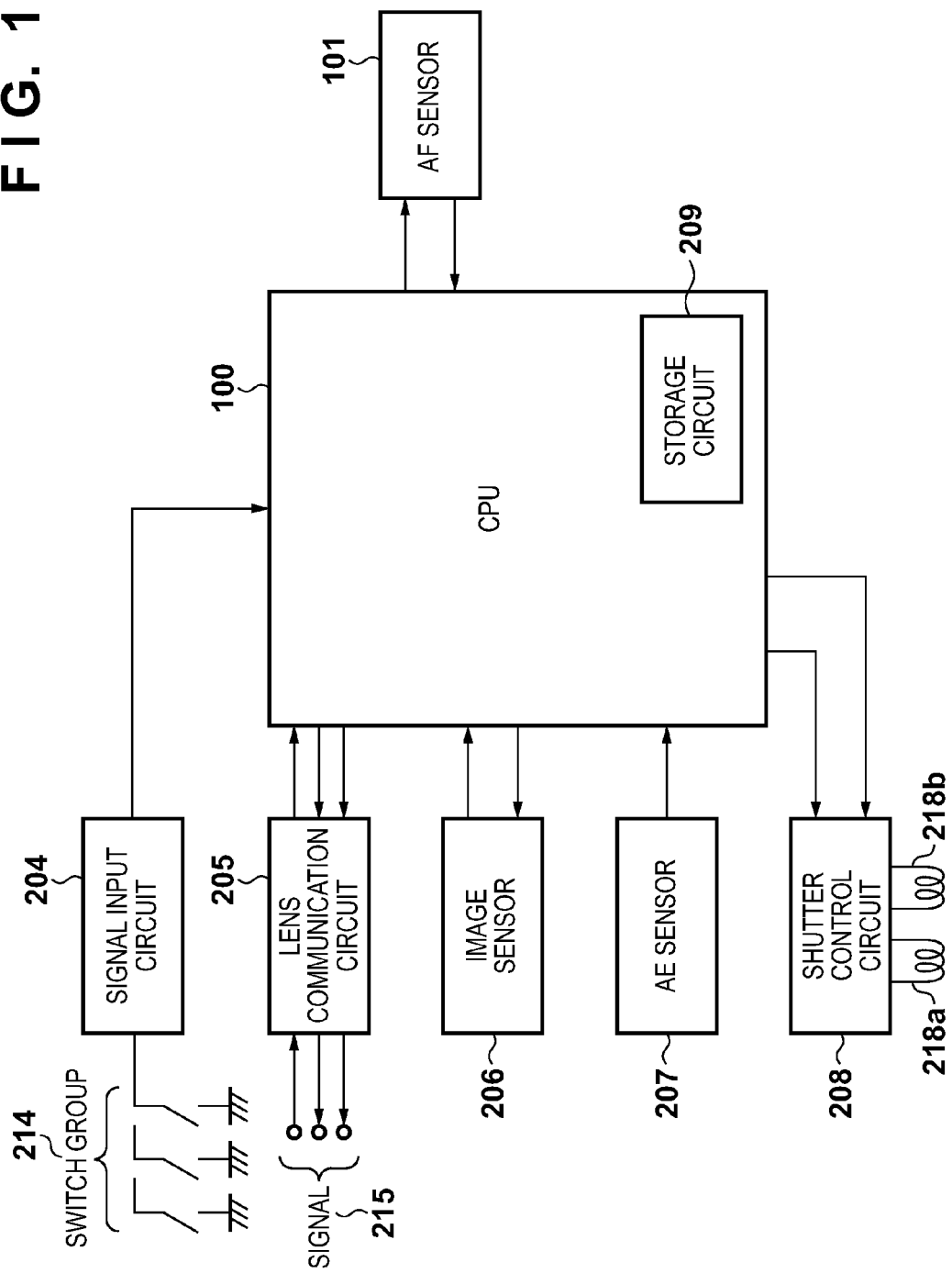
FIG. 1 is a block diagram showing the arrangement of a camera according to an embodiment of the present invention.

FIG. 1 is a block diagram showing the schematic arrangement of a camera including an AF sensor according to the first embodiment of the present invention.

Referring to FIG. 1, a signal input circuit 204 configured to detect a switch group 214 for various operations of the camera, an image sensor (image capturing element) 206, and an AE sensor 207 are connected to a microcomputer (to be referred to as a CPU hereinafter) 100 for a camera. Also connected are a shutter control circuit 208 configured to control shutter magnets 218a and 218b and an AF sensor (focus detection sensor) 101. The CPU 100 transmits/receives a signal 215 to/from an imaging lens 300 (see FIG. 2) via a lens communication circuit 205, thereby controlling the focus position and the stop. The operation of the camera is decided by setting the switch group 214.

The AF sensor 101 includes a line sensor. The CPU 100 controls the AF sensor 101, thereby detecting the defocus amount from an object contrast distribution obtained by the line sensor and controlling the focus position of the imaging lens 300 (see FIG. 2).

The CPU 100 controls the AE sensor 207, thereby detecting the luminance of the object and deciding the f-number of the imaging lens 300 and the shutter speed. The f-number is controlled via the lens communication circuit 205. In addition, the energizing time of the shutter magnets 218a and 218b is adjusted via the shutter control circuit 208, thereby controlling the shutter speed. Furthermore, the image sensor 206 is controlled, thereby performing an imaging operation.

The CPU 100 incorporates a storage circuit 209 such as a ROM that stores programs used to control the camera operations, a RAM used to store variables, and an EEPROM (Electrically Erasable and Programmable ROM) used to store various parameters.

The optical arrangement of the camera will be described next with reference to FIG. 2. Most components of a light beam that has entered from an object via the imaging lens 300 are reflected upward by a quick return mirror 305 and form an object image on a finder screen 303. The user of the camera can observe this image via a pentaprism 301 and an eyepiece 302. Some components of the imaging light beam pass through the quick return mirror 305, are bent downward by a sub-mirror 306 on the rear side, and form an image on the AF sensor 101 via a field mask 307, a field lens 311, a stop 308, and a secondary image forming lens 309. An image signal obtained by photo-electrically converting the image is processed, thereby detecting the focus state of the imaging lens 300. At the time of imaging, the quick return mirror 305 is lifted. The whole light beam forms an image on the image sensor 206, and the object image is exposed. The image sensor 206 generates an image capturing signal by photo-electrically converting the object image, and outputs the imaging signal.

Figure 2:
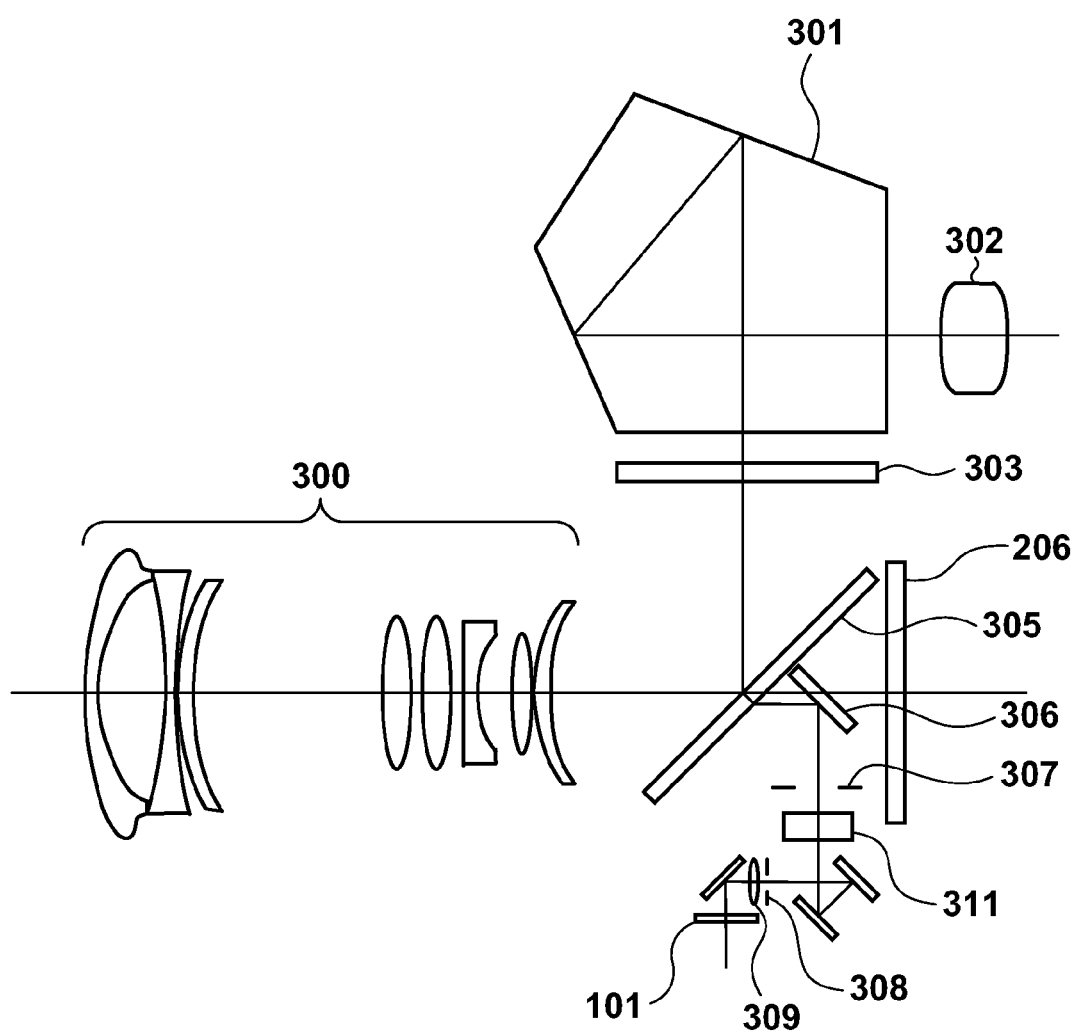
FIG. 2 is a view showing the arrangement of the optical system of the camera.

The focus detection method of the focus detection apparatus (formed from the optical system from the field mask 307 to the secondary image forming lens 309 and the AF sensor 101 in FIG. 2) according to this embodiment is the known phase difference detection method. The focus detection apparatus can detect the focus states of a plurality of different areas on the screen.

Figure 3:
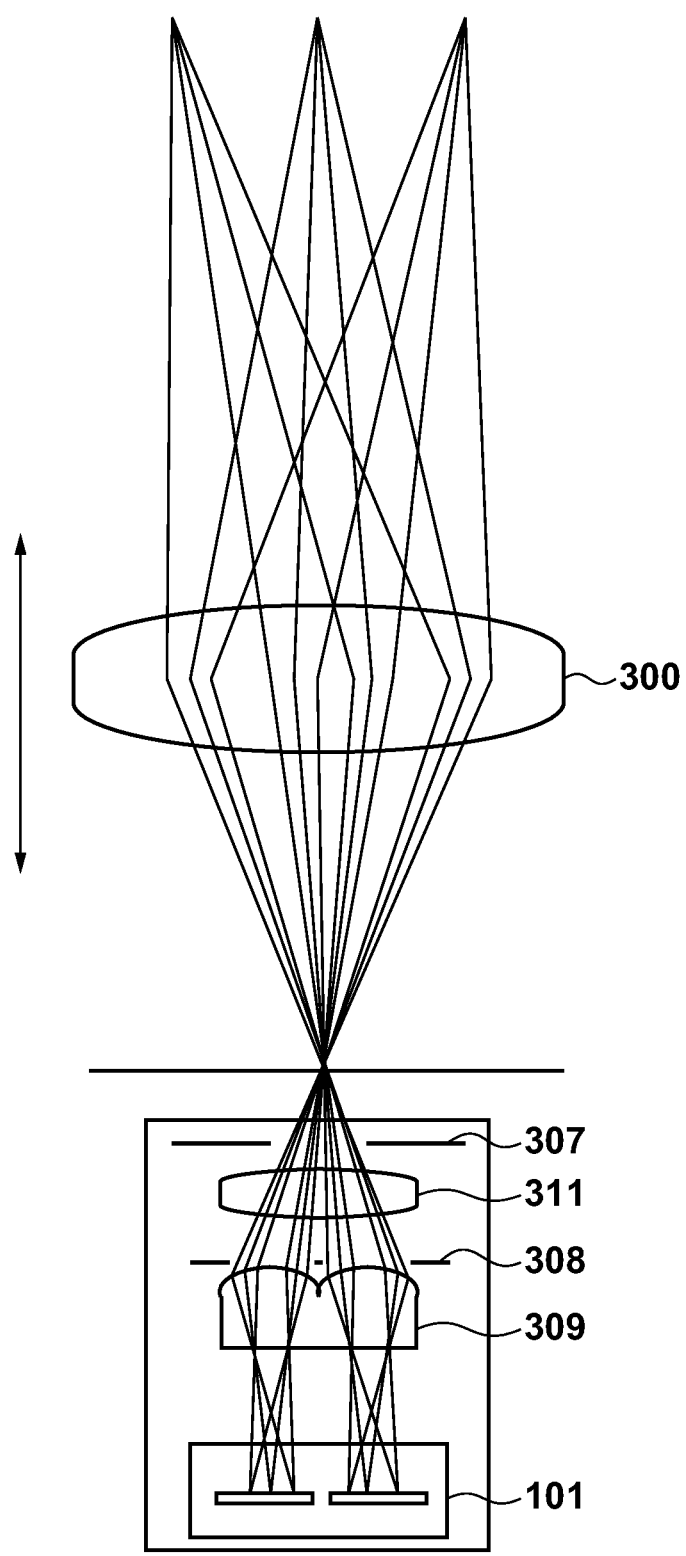
FIG. 3 is a view showing the optical arrangement of a focus detection apparatus.

FIG. 3 shows the detailed arrangement of the optical system associated with focus detection. A light beam from an object, which has passed through the imaging lens 300, is reflected by the sub-mirror 306 (see FIG. 2) and temporarily forms an image near the field mask 307 that exists on a plane conjugate to the image capturing plane. FIG. 3 illustrates the developed optical path of the light beam reflected and turned by the sub-mirror 306. The field mask 307 is a member configured to block excess light outside the focus detection area (to also be referred to as an AF frame hereinafter) on the screen.

The field lens 311 has a function of forming an image of each opening of the stop 308 near the exit pupil of the imaging lens 300. The secondary image forming lens 309 is arranged on the rear side of the stop 308. The secondary image forming lens 309 includes a pair of lenses. The lenses correspond to the openings of the stop 308, respectively. Light beams that have passed through the field mask 307, the field lens 311, the stop 308, and the secondary image forming lens 309 form images on the line sensors on the AF sensor 101.

The relationship between the line sensors on the AF sensor 101 and the AF frame in the imaging screen will be described with reference to FIGS. 4 and 5.

Figure 4:
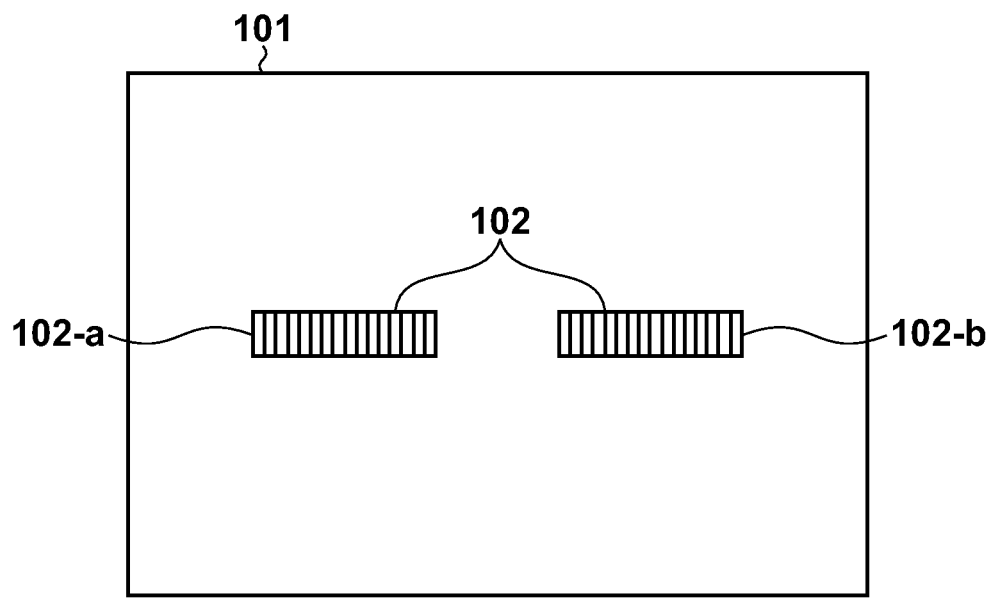
FIG. 4 is a view showing the arrangement of line sensors.

FIG. 4 is a view showing the arrangement of the line sensors of the AF sensor 101. Line sensors 102-a and 102-b are paired by the secondary image forming lens 309 and form the line sensor 102. The line sensor 102 includes the pair of line sensors for receiving light beams that have passed through different pupil areas of the imaging lens 300. The phase difference between two images output from the pair of line sensors is detected, thereby detecting the defocus amount.

Figure 5:
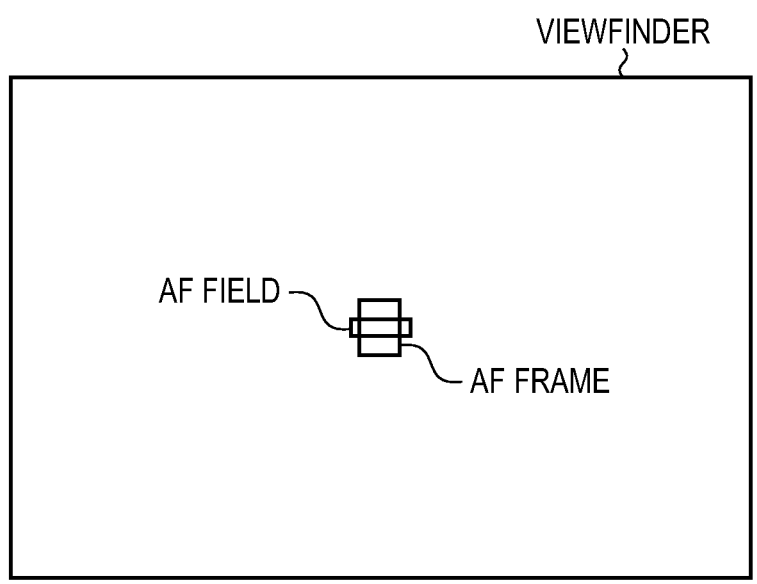
FIG. 5 is a view showing the arrangement of line sensors and an AF frame.

FIG. 5 is a view showing the arrangement of the AF frame displayed in the viewfinder and the AF field by the line sensors on the AF sensor 101. Identical object images are formed on the line sensors 102-a and 102-b in an in-focus state.

Figure 6:
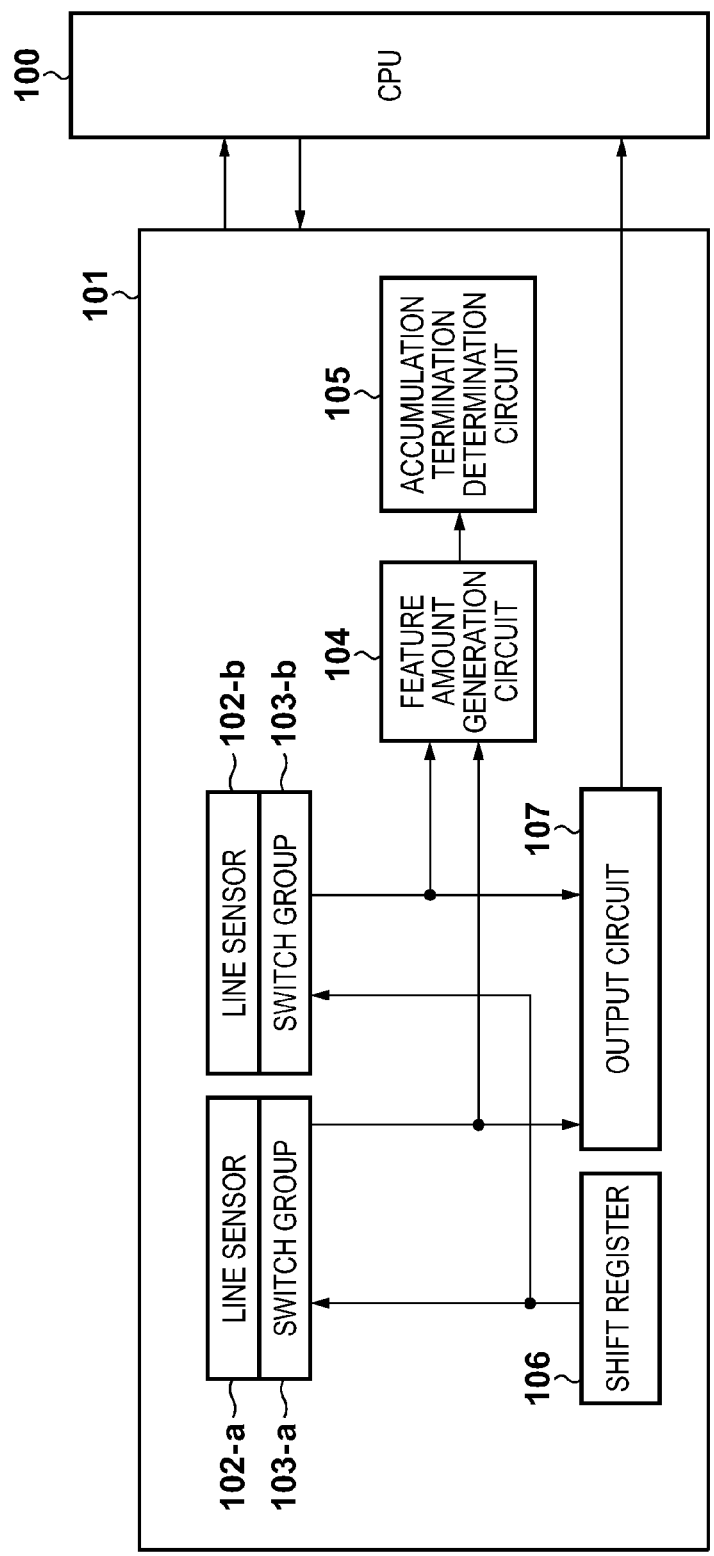
FIG. 6 is a block diagram showing the arrangement of the AF sensor according to the embodiment of the present invention.

The detailed circuit arrangement of the AF sensor 101 will be described with reference to the block diagram of FIG. 6. The object image formed by the secondary image forming lens 309 is photo-electrically converted by the line sensor 102 and accumulated as electric charges. The accumulation signals of the line sensors are output to a feature amount generation circuit 104 to be described later and an output circuit 107 via switch groups 103-a and 103-b formed from switches corresponding to the pixels.

The feature amount generation circuit 104 generates the feature amount of the pixel signal of the line sensor 102 and outputs it to an accumulation termination determination circuit 105.

Figure 7:
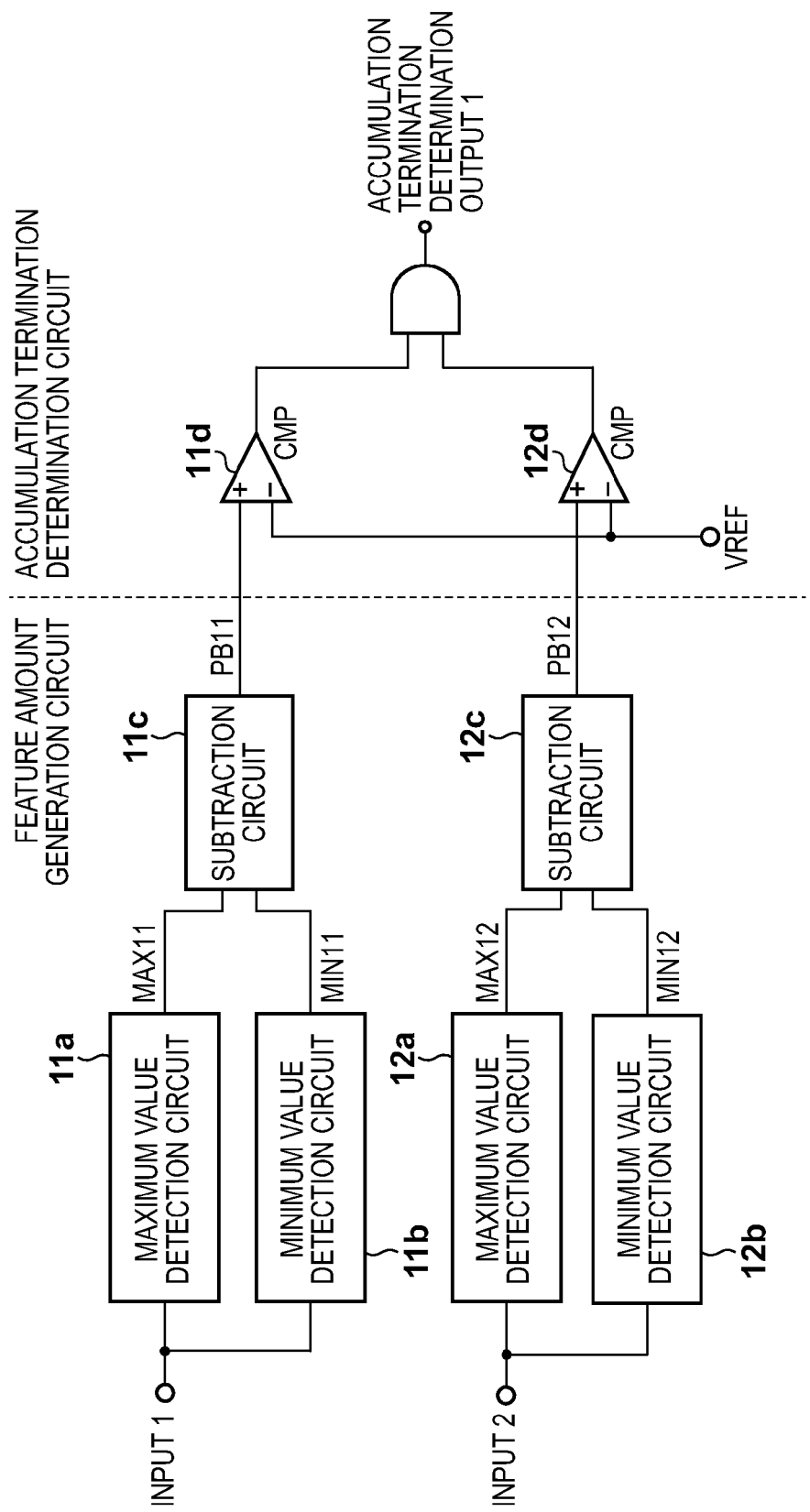
FIG. 7 is a block diagram showing a feature amount generation circuit and an accumulation termination determination circuit according to the first embodiment.

FIG. 7 shows the circuit diagrams of the feature amount generation circuit 104 and the accumulation termination determination circuit 105. The feature amount generation circuit 104 includes a maximum value detection circuit 11a, a minimum value detection circuit 11b, a subtraction circuit 11c, a maximum value detection circuit 12a, a minimum value detection circuit 12b, and a subtraction circuit 12c. Input 1 is a signal from the line sensor 102-a connected via the switch group 103-a. Input 2 is a signal from the line sensor 102-b connected via the switch group 103-b. The subtraction circuit 11c subtracts a minimum value MIN11 (signal value) of input 1 detected by the minimum value detection circuit 11b from a maximum value MAX11 of input 1 detected by the maximum value detection circuit 11a, and outputs a resultant signal PB11 to the accumulation termination determination circuit 105. The subtraction circuit 12c subtracts a minimum value MIN12 of input 2 detected by the minimum value detection circuit 12b from a maximum value MAX12 of input 2 detected by the maximum value detection circuit 12a, and outputs a resultant signal PB12 to the accumulation termination determination circuit 105. That is, the signal PB11 represents the contrast of the signal accumulated by the line sensor 102-a, and the signal PB12 represents the contrast of the signal accumulated by the line sensor 102-b.

The accumulation termination determination circuit 105 includes a comparator CMP 11d configured to compare PB11 with a comparative voltage VREF, a comparator CMP 12d configured to compare PB12 with the comparative voltage VREF, and an AND circuit that receives the outputs of the comparator CMP 11d and the comparator CMP 12d.

The CPU 100 drives a shift register 106 to control the switch groups 103-a and 103-b. The pixel signal accumulated in the line sensor 102 is output to the output circuit 107 for each pixel. The output circuit 107 extracts the contrast component from the pixel signal, performs processing such as amplification, and outputs the signal to the A/D converter (not shown) of the CPU 100.

Figure 8:
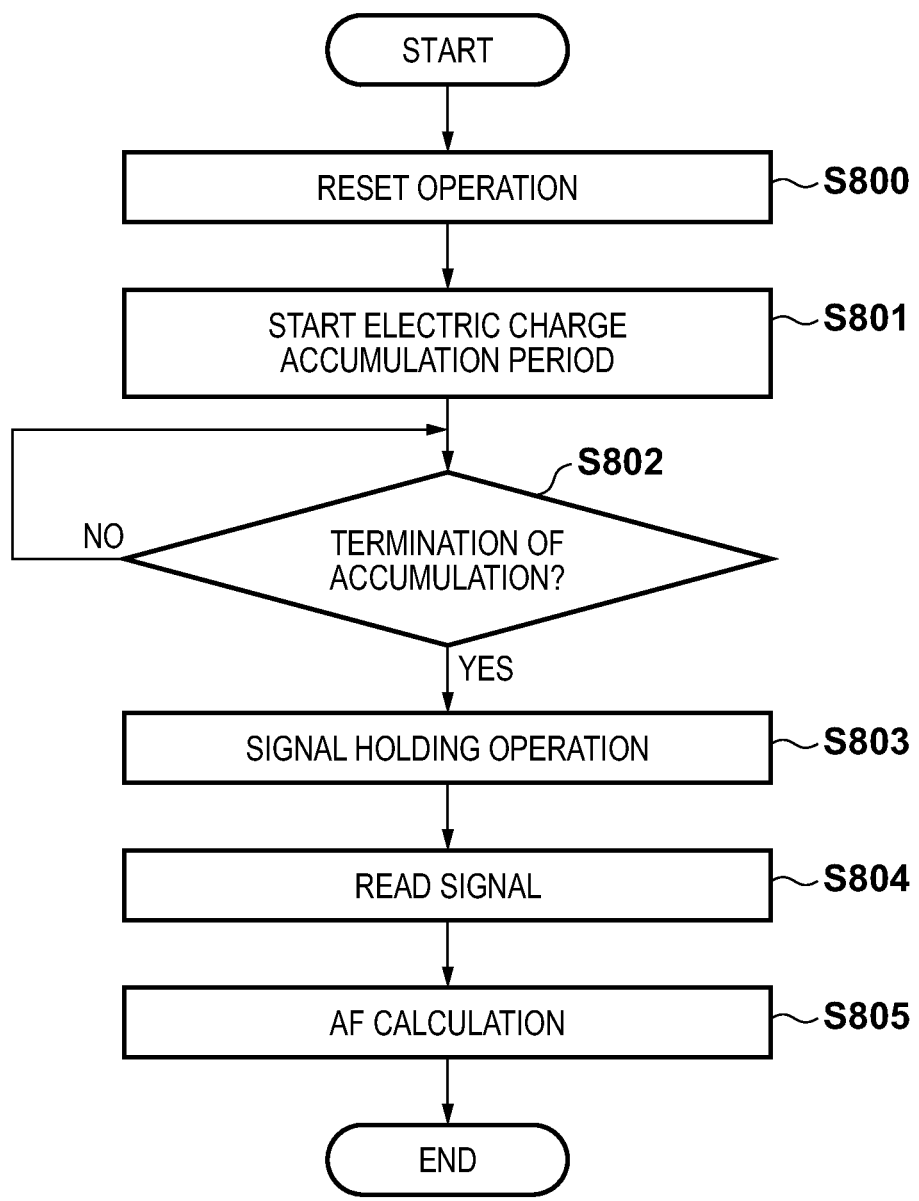
FIG. 8 is a flowchart of a focus detection operation according to the first embodiment.
Figure 9:
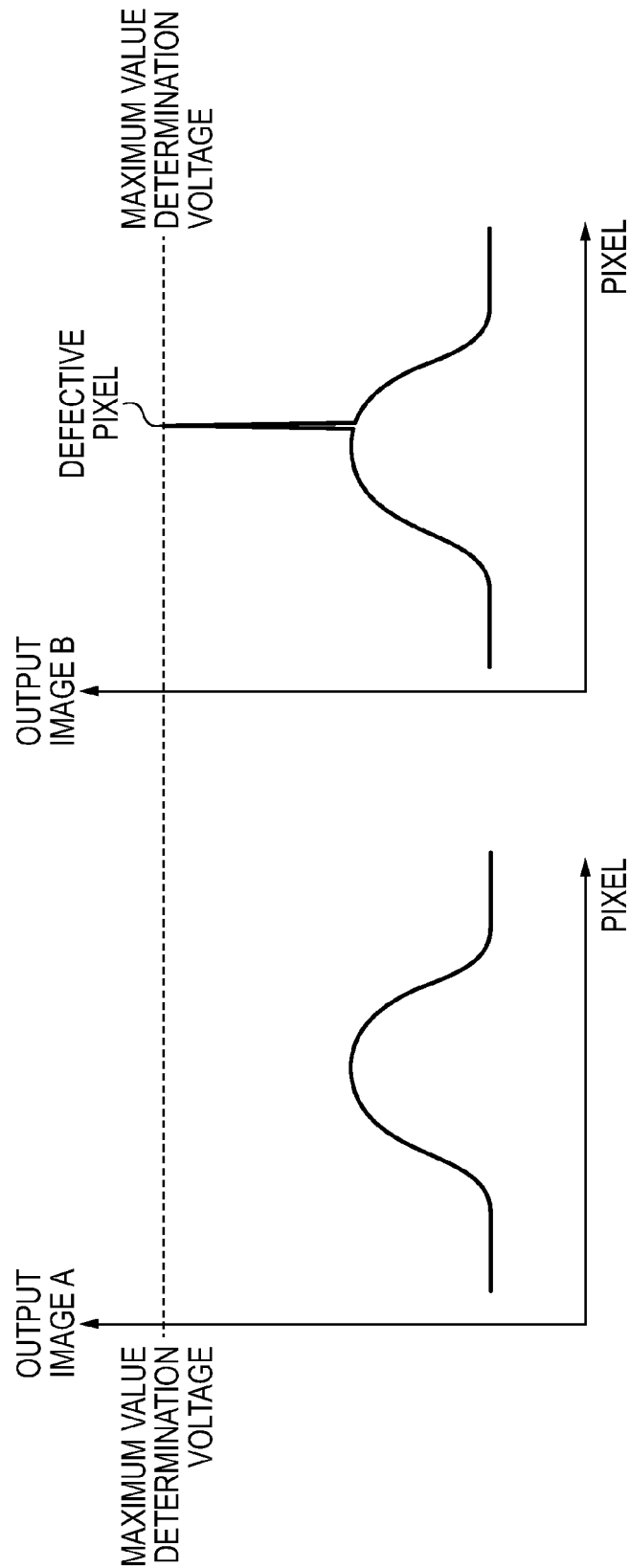
FIGS. 9A and 9B are graphs showing signals generated from object images and a defective pixel.

The operation of the focus detection apparatus having the above-described arrangement will be described in detail with reference to the flowchart of FIG. 8. FIGS. 9A and 9B show the relationship between an object image and a defective pixel. Assume that FIG. 9A shows input 1, and FIG. 9B shows input 2.

When a focus detection start signal is received by operating the switch group 214, the AF sensor 101 is controlled from the CPU 100, thereby starting the focus detection operation.

In step S800, the AF sensor 101 is controlled from the CPU 100, thereby resetting the line sensor 102. In step S801, the electric charge accumulation period starts.

In step S802, the feature amount generation circuit 104 generates a feature amount based on the signal from the line sensor 102 during the electric charge accumulation period. The accumulation termination determination circuit 105 determines termination of the accumulation based on the feature amount. At this time, the CPU 100 acquires information of defective pixels checked in the manufacturing step in advance from the storage circuit 209 and turns off the switches connected to the defective pixels so the defective pixels are not connected to the feature amount generation circuit 104.

Assume that FIG. 9A shows the signal input from the signal of the line sensor 102-a via the switch group 103-a, and FIG. 9B shows the signal input from the signal of the line sensor 102-b via the switch group 103-b. Since the defective pixel existing in FIG. 9B has occurred after the check in the manufacturing step, the information is not stored in the CPU 100, and the defective pixel is not excluded by controlling the switch group.

Figure 10:
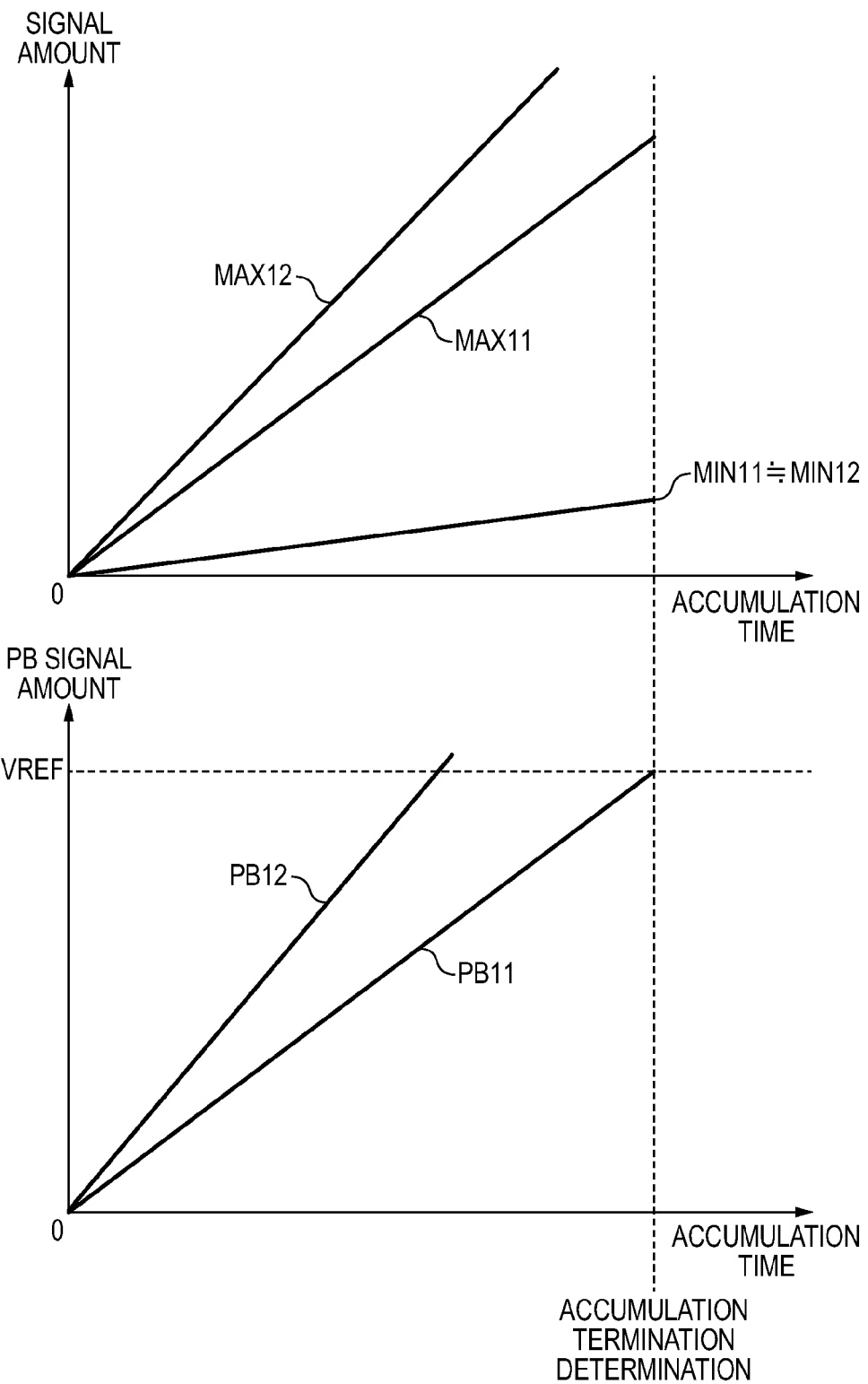
FIG. 10 shows graphs of the signals of the feature amount generation circuit and the accumulation termination determination circuit according to the first embodiment.

FIG. 10 shows the relationship between the accumulation time and the signals in the feature amount generation circuit 104. Accumulation time 0 is the accumulation start timing. Along with the elapse of time, MAX11, MIN11, MAX12, and MIN12 increase. MAX12 should exhibit almost the same signal change as MAX11, but exhibits a larger gradient than MAX11 due to the influence of the defective pixel. MIN11 and MIN12 exhibit almost the same value. PB11 and PB12 that are the difference signals between MAX11 and MIN11 and between MAX12 and MIN12 exhibit waveforms as shown in FIG. 10.

PB12 exhibits a larger gradient than PB11 and reaches VREF that is the determination voltage at a timing earlier than PB11, and CMP 12d outputs a high-level signal (second determination). However, since PB11 does not reach VREF that is the determination voltage, the output of CMP 11d is not inverted, and accumulation termination determination output 1 that is the AND of these outputs remains at low level. When the time elapses, and PB11 reaches VREF that is the determination voltage, the output of CMP 11d is inverted, and the accumulation termination determination output changes to high level. Since accumulation termination determination output 1 also changes to high level, the accumulation termination determination is done. If the accumulation termination determination is not performed within a predetermined time, control is performed to forcibly terminate the accumulation.

When the accumulation termination determination is done, the process advances to step S803 to perform a signal holding operation. After that, in step S804, a signal read operation is performed. In step S805, AF calculation is performed.

As described above, in this embodiment, the feature amount generation circuit 104 and the accumulation termination determination circuit 105 are configured as shown in FIG. 7. A feature amount corresponding to the signal contrast is generated for each of the line sensors 102-a and 102-b, and accumulation termination determination is performed for each feature amount. The circuit is configured not to perform the accumulation termination operation unless the accumulation termination determination is done for both the line sensors 102-a and 102-b. This makes it possible to perform appropriate accumulation control without the influence of a defective pixel existing in one of the line sensors. When the appropriately accumulated signal is used, more accurate focus detection calculation can be performed. The circuit may be configured to perform the accumulation termination operation when both the maximum value signals of the line sensors 102-a and 102-b have reached the maximum value determination voltage.

The defective pixel according to this embodiment exhibits a larger gradient of signal increase as compared to the normal pixel. However, the embodiment is effective even for a defect whose signal is fixed to a predetermined potential such as a ground potential or a power supply potential.

Second Embodiment

A feature amount generation circuit 104 and an accumulation termination determination circuit 105 included in an AF sensor 101 according to the second embodiment of the present invention will be described below with reference to FIG. 11.

The feature amount generation circuit 104 includes a maximum value detection circuit 21a, a minimum value detection circuit 21b, a subtraction circuit 21c, a maximum value detection circuit 22a, a minimum value detection circuit 22b, a subtraction circuit 22c, and a minimum value detection circuit 23. Input 1 is a signal from a line sensor 102-a connected via a switch group 103-a. Input 2 is a signal from a line sensor 102-b connected via a switch group 103-b. The subtraction circuit 21c subtracts a minimum value MIN21 of input 1 detected by the minimum value detection circuit 21b from a maximum value MAX21 of input 1 detected by the maximum value detection circuit 21a, and outputs a resultant signal PB21 to the minimum value detection circuit 23. The subtraction circuit 22c subtracts a minimum value MIN22 of input 2 detected by the minimum value detection circuit 22b from a maximum value MAX22 of input 2 detected by the maximum value detection circuit 22a, and outputs a resultant signal PB22 to the minimum value detection circuit 23. That is, the signal PB21 represents the contrast of the signal accumulated by the line sensor 102-a, and the signal PB22 represents the contrast of the signal accumulated by the line sensor 102-b. The minimum value detection circuit 23 outputs a smaller one of the two input signals to the accumulation termination determination circuit 105 as a feature amount MIN23 of the object image. The accumulation termination determination circuit 105 includes a comparator CMP 21 configured to compare the output of the feature amount generation circuit 104 with a comparative voltage VREF.

The operations of the feature amount generation circuit 104 and the accumulation termination determination circuit 105 according to this embodiment in accumulation termination determination step S802 of the flowchart shown in FIG. 8 will be described. FIGS. 9A and 9B show the relationship between an object image and a defective pixel. Assume that FIG. 9A shows input 1, and FIG. 9B shows input 2.

Figure 12:
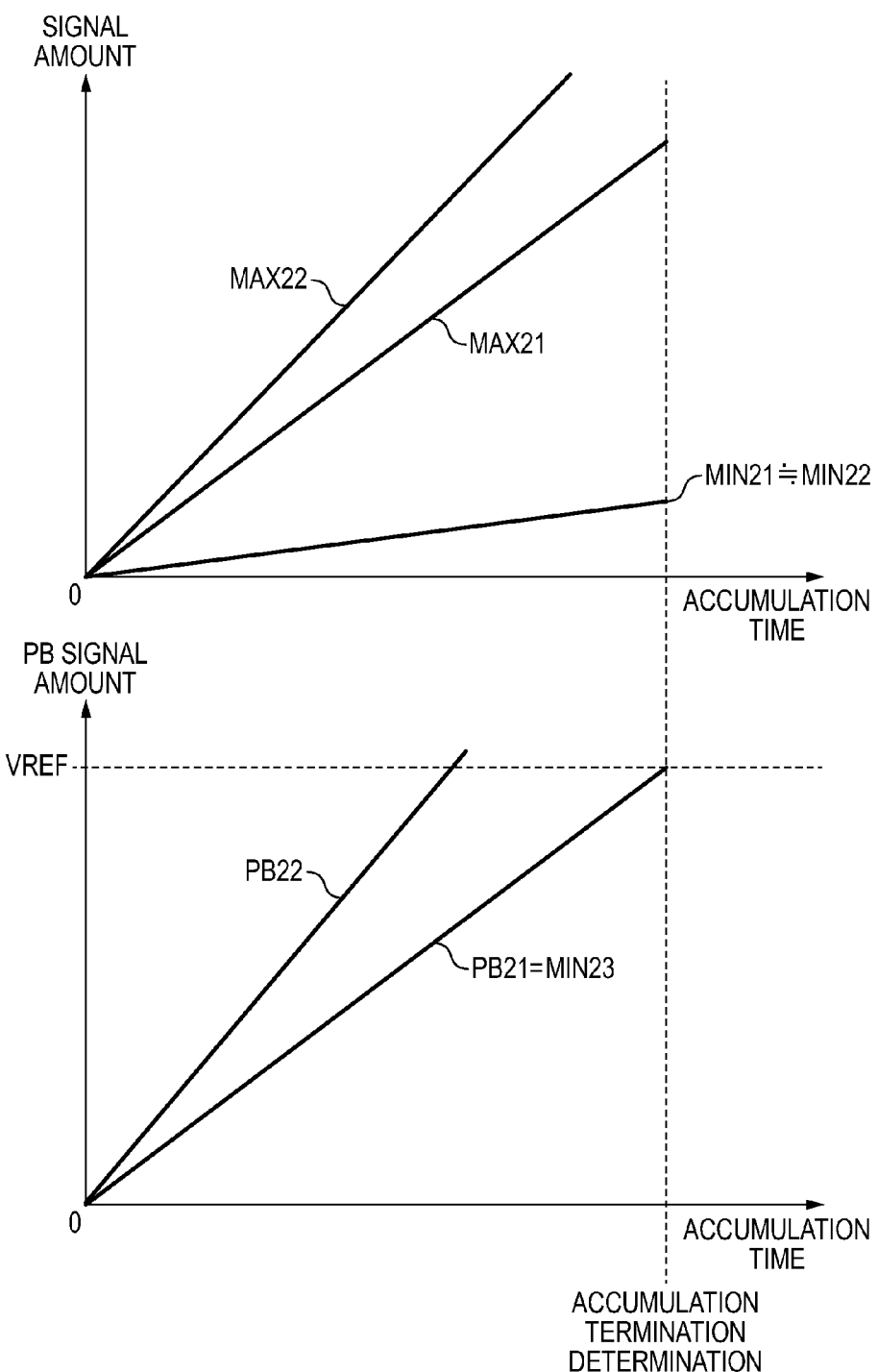
FIG. 12 shows graphs of the signals of the feature amount generation circuit and the accumulation termination determination circuit according to the second embodiment.

FIG. 12 shows the relationship between the accumulation time and the signals in the feature amount generation circuit 104. Accumulation time 0 is the accumulation start timing. Along with the elapse of time, MAX21, MIN21, MAX22, and MIN22 increase. MAX22 should exhibit almost the same signal change as MAX21, but exhibits a larger gradient than MAX21 due to the influence of the defective pixel. MIN21 and MIN22 exhibit almost the same value. PB21 and PB22 that are the difference signals between MAX21 and MIN21 and between MAX22 and MIN22 exhibit waveforms as shown in FIG. 12. MIN23 equals PB21 that is the minimum value out of PB21 and PB22.

When the time elapses, and MIN23 (=PB21) reaches VREF that is the determination voltage, the output of CMP 21 is inverted, accumulation termination determination output 2 changes to high level, and accumulation termination determination is done. That is, the accumulation termination determination is not affected by the defective pixel.

Figure 11:
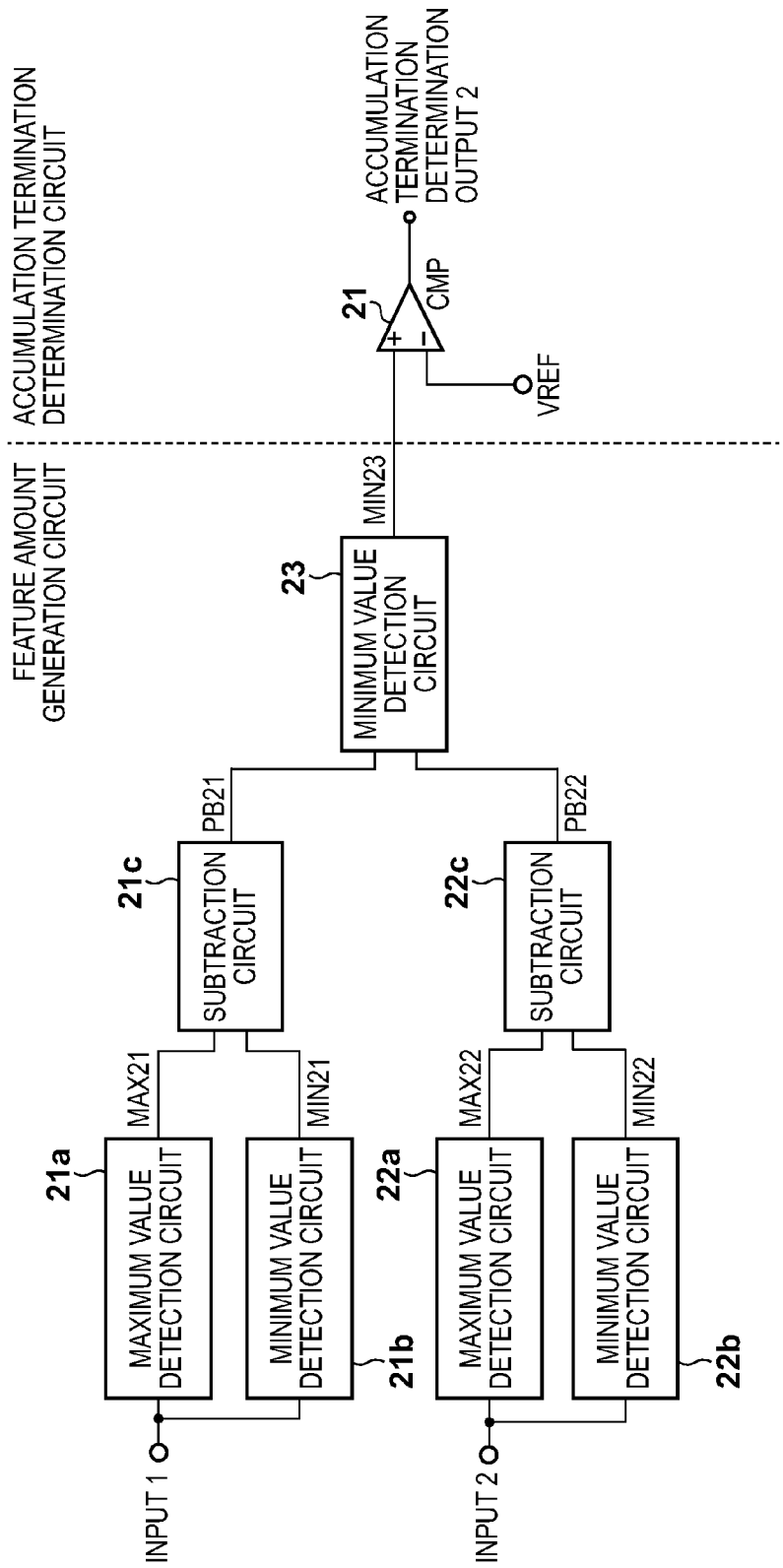
FIG. 11 is a block diagram showing a feature amount generation circuit and an accumulation termination determination circuit according to the second embodiment.

As described above, in this embodiment, the feature amount generation circuit 104 and the accumulation termination determination circuit 105 are configured as shown in FIG. 11. The feature amount of the object image is generated using the feature amount for each of the line sensors 102-a and 102-b, thereby performing accumulation termination determination. As a result, it is possible to perform appropriate accumulation control without the influence of a defective pixel existing in one of the line sensors.

In this embodiment, the number of comparators each having a large circuit scale can be decreased by one as compared to the arrangement of the first embodiment. It is therefore possible to make the circuit scale smaller while obtaining the same effect as in the first embodiment.

Third Embodiment

A feature amount generation circuit 104 and an accumulation termination determination circuit 105 included in an AF sensor 101 according to the third embodiment of the present invention will be described below with reference to FIG. 13.

The feature amount generation circuit 104 includes a maximum value detection circuit 31a, a maximum value detection circuit 32a, a maximum value detection circuit 33a, a minimum value detection circuit 31b, a minimum value detection circuit 32b, a minimum value detection circuit 33b, and a subtraction circuit 31. Input 1 is a signal from a line sensor 102-*a* connected via a switch group 103-*a*. Input 2 is a signal from a line sensor 102-*b* connected via a switch group 103-*b*.

The minimum value detection circuit 33*b* outputs a signal MIN33 that is a smaller one of a maximum value MAX31 of input 1 detected by the maximum value detection circuit 31*a* and a maximum value MAX32 of input 2 detected by the maximum value detection circuit 32*a*. The maximum value detection circuit 33*a* outputs a signal MAX33 that is a larger one of a minimum value MIN31 of input 1 detected by the minimum value detection circuit 31*b* and a minimum value MIN32 of input 2 detected by the minimum value detection circuit 32*b*. The subtraction circuit 31 outputs a difference signal PB31 between MIN33 and MAX33 to the accumulation termination determination circuit 105 as the feature amount of the object image. The accumulation termination determination circuit 105 includes a comparator CMP 34 configured to compare the output of the feature amount generation circuit 104 with a comparative voltage VREF.

The operations of the feature amount generation circuit 104 and the accumulation termination determination circuit 105 in accumulation termination determination step S802 of the flowchart shown in FIG. 8 will be described.

Figure 14B:
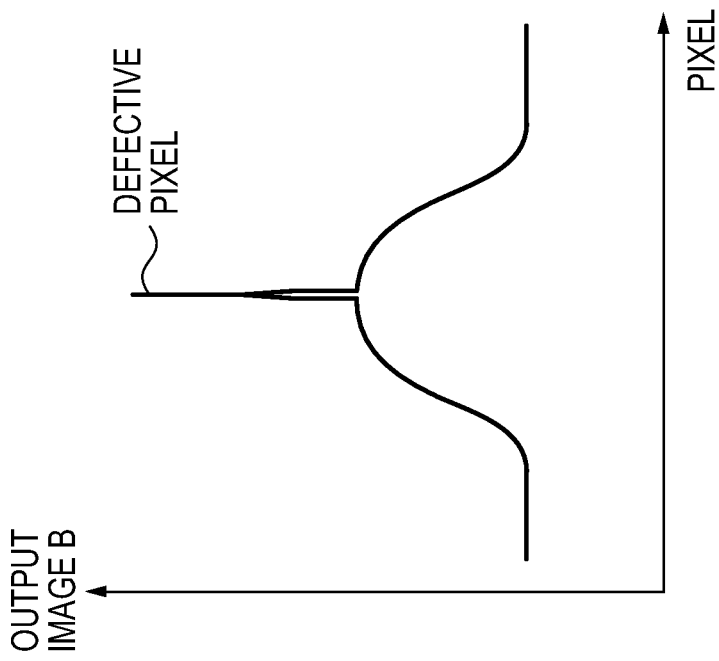
FIGS. 14A and 14B are graphs showing defective pixels and signals according to the third embodiment.
Figure 14A:
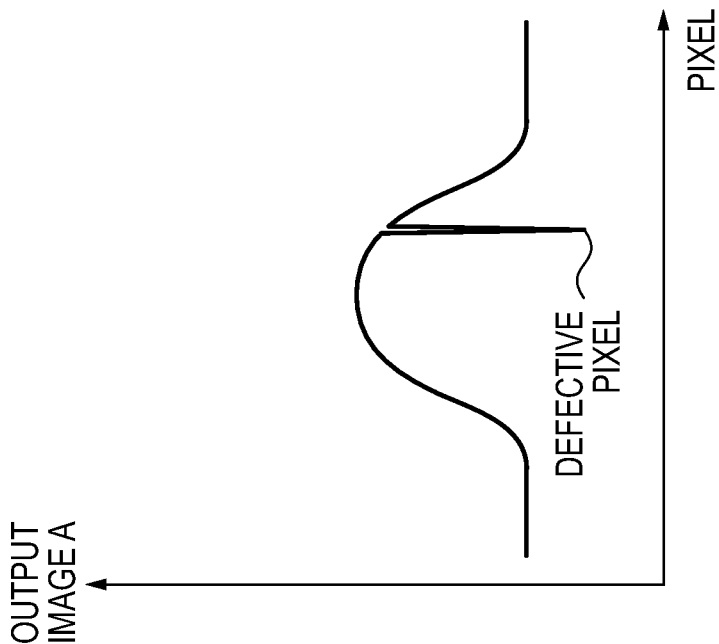

FIGS. 14A and 14B show the relationship between an object image and a defective pixel. Assume that FIG. 14A shows input 1, and FIG. 14B shows input 2. The defective pixel shown in FIG. 14A is a pixel whose signal does not grow even upon receiving light as compared to a normal pixel.

Figure 15:
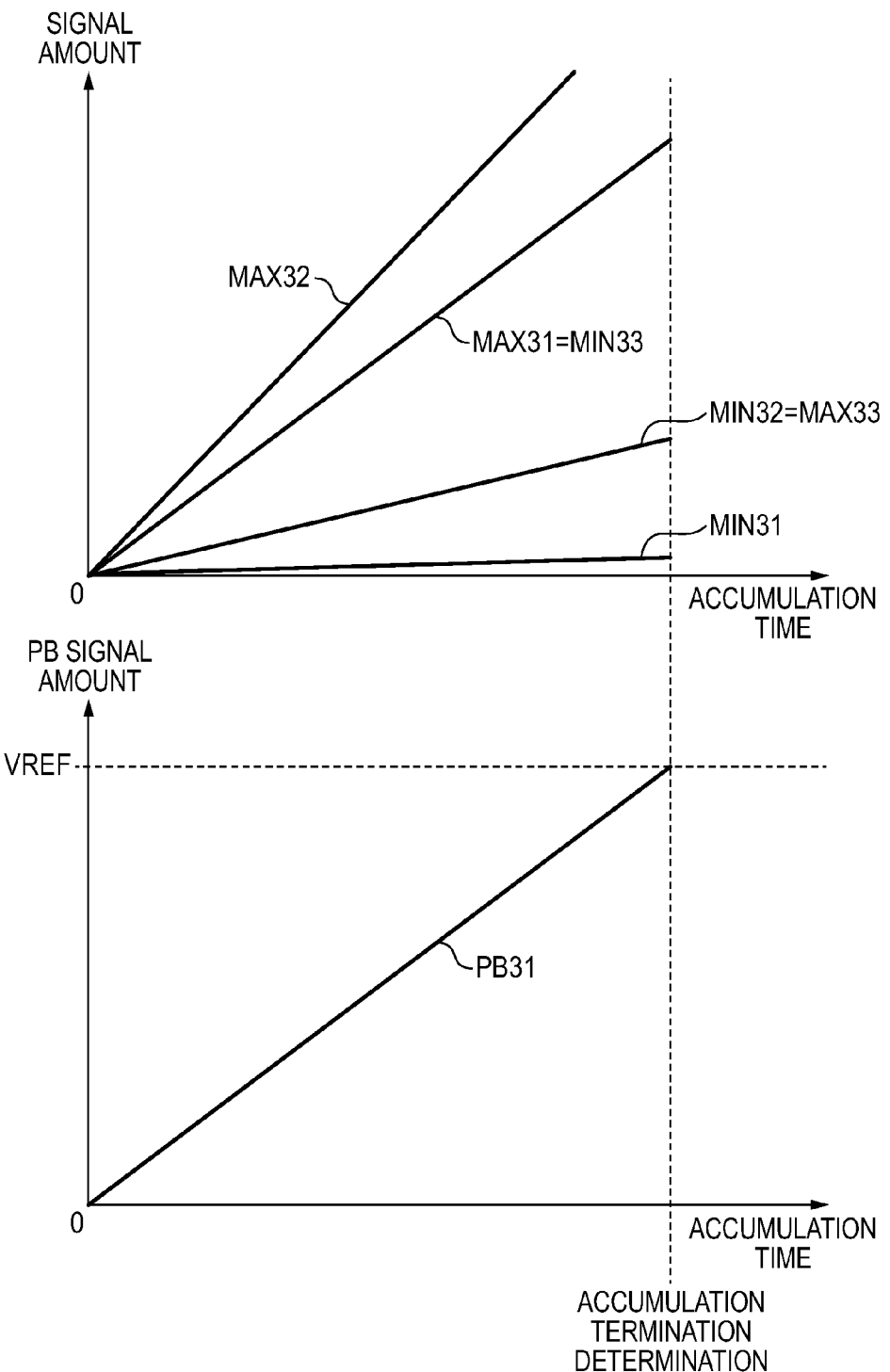
FIG. 15 shows graphs of the signals of the feature amount generation circuit and the accumulation termination determination circuit according to the third embodiment.

FIG. 15 shows the relationship between the accumulation time and the signals in the feature amount generation circuit 104. Accumulation time 0 is the accumulation start timing. MAX32 should exhibit almost the same signal change as MAX31, but exhibits a larger gradient than MAX31 due to the influence of the defective pixel. MIN31 should exhibit almost the same signal change as MIN32, but exhibits a smaller gradient than MIN32 due to the influence of the defective pixel.

MIN33 exhibits the same signal amount as MAX31 that is the smaller one out of MAX31 and MAX32. MAX33 exhibits the same signal amount as MIN32 that is the larger one out of MIN31 and MIN32. PB31 that is the difference signal between MIN33 and MAX33 exhibits a waveform as shown in FIG. 15.

When the time elapses, and PB31 reaches VREF that is the determination voltage, the output of CMP 31 is inverted, accumulation termination determination output 3 changes to high level, and accumulation termination determination is done. That is, the accumulation termination determination is not affected by the defective pixel.

Figure 13:
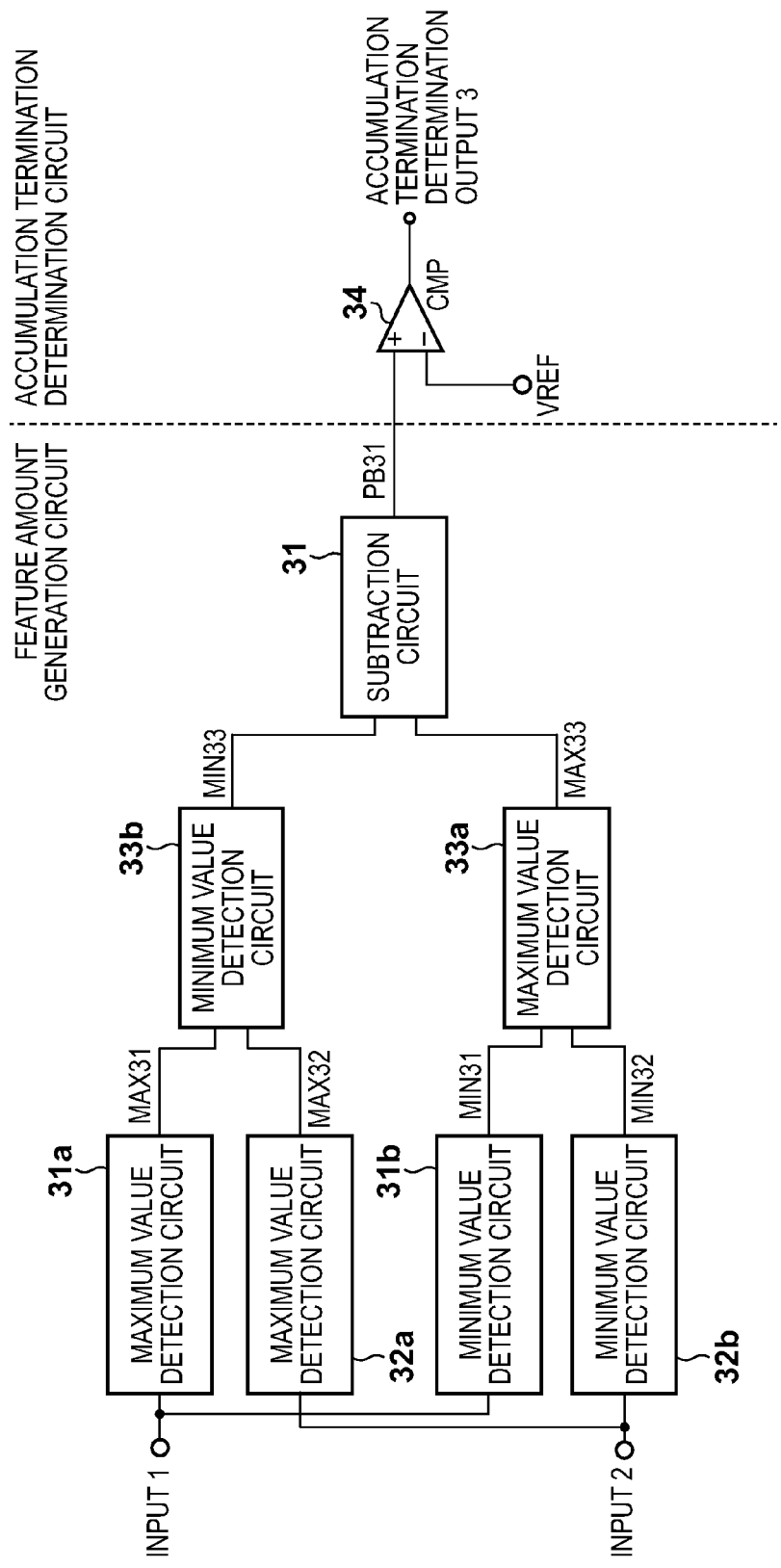
FIG. 13 is a block diagram showing a feature amount generation circuit and an accumulation termination determination circuit according to the third embodiment.

As described above, in this embodiment, the feature amount generation circuit 104 and the accumulation termination determination circuit 105 are configured as shown in FIG. 13. It is possible to perform appropriate accumulation control without the influence of a defective pixel even for waveforms including defective pixels as shown in FIGS. 14A and 14B.

Fourth Embodiment

Figure 16:
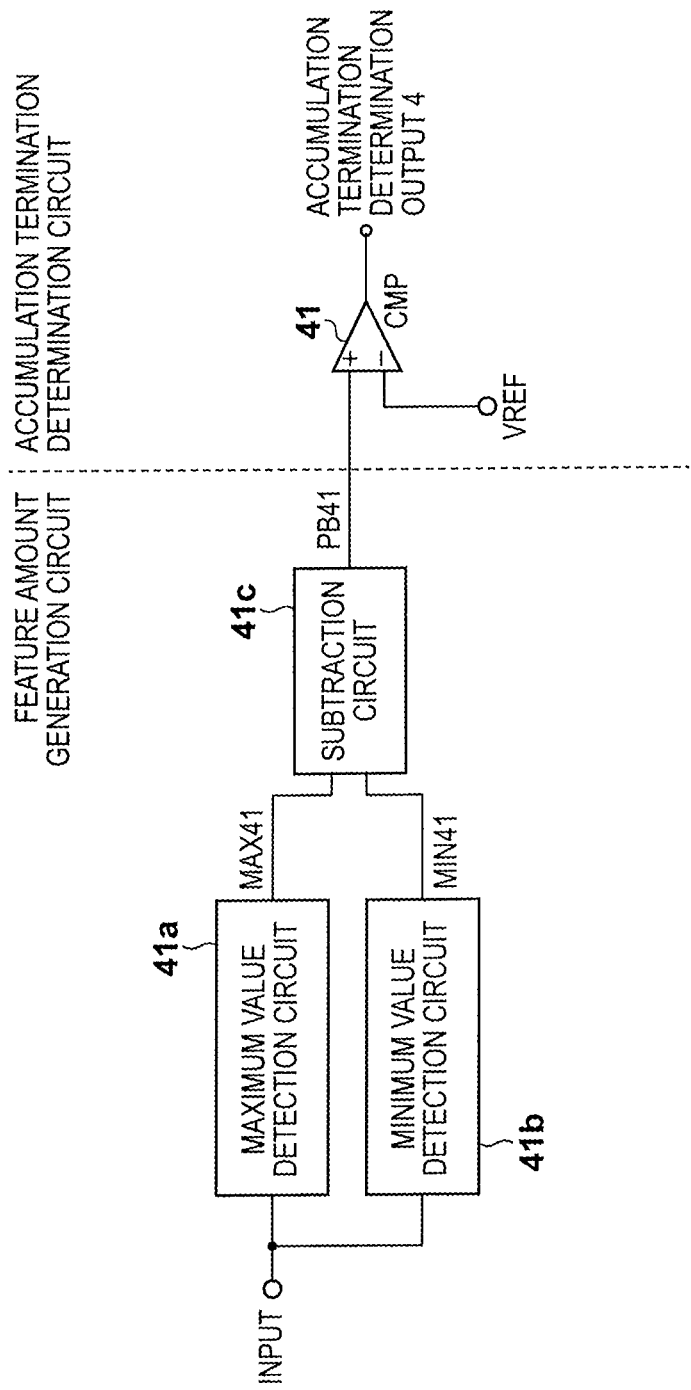
FIG. 16 is a block diagram showing a feature amount generation circuit and an accumulation termination determination circuit according to the fourth embodiment.

A feature amount generation circuit 104 and an accumulation termination determination circuit 105 included in an AF sensor 101 according to the fourth embodiment of the present invention will be described below with reference to FIG. 16.

The feature amount generation circuit 104 includes a maximum value detection circuit 41*a*, a minimum value detection circuit 41*b*, and a subtraction circuit 41*c*. The input is a signal from a line sensor 102 connected via switch groups 103-*a* and 103-*b*. The subtraction circuit 41*c* subtracts a minimum value MIN41 of the input detected by the minimum value detection circuit 41*b* from a maximum value MAX41 of the input detected by the maximum value detection circuit 41*a*, and outputs a resultant signal PB41 to the accumulation termination determination circuit 105. The accumulation termination determination circuit 105 includes a comparator CMP 41 configured to compare the output of the feature amount generation circuit 104 with a comparative voltage VREF.

Figure 17:
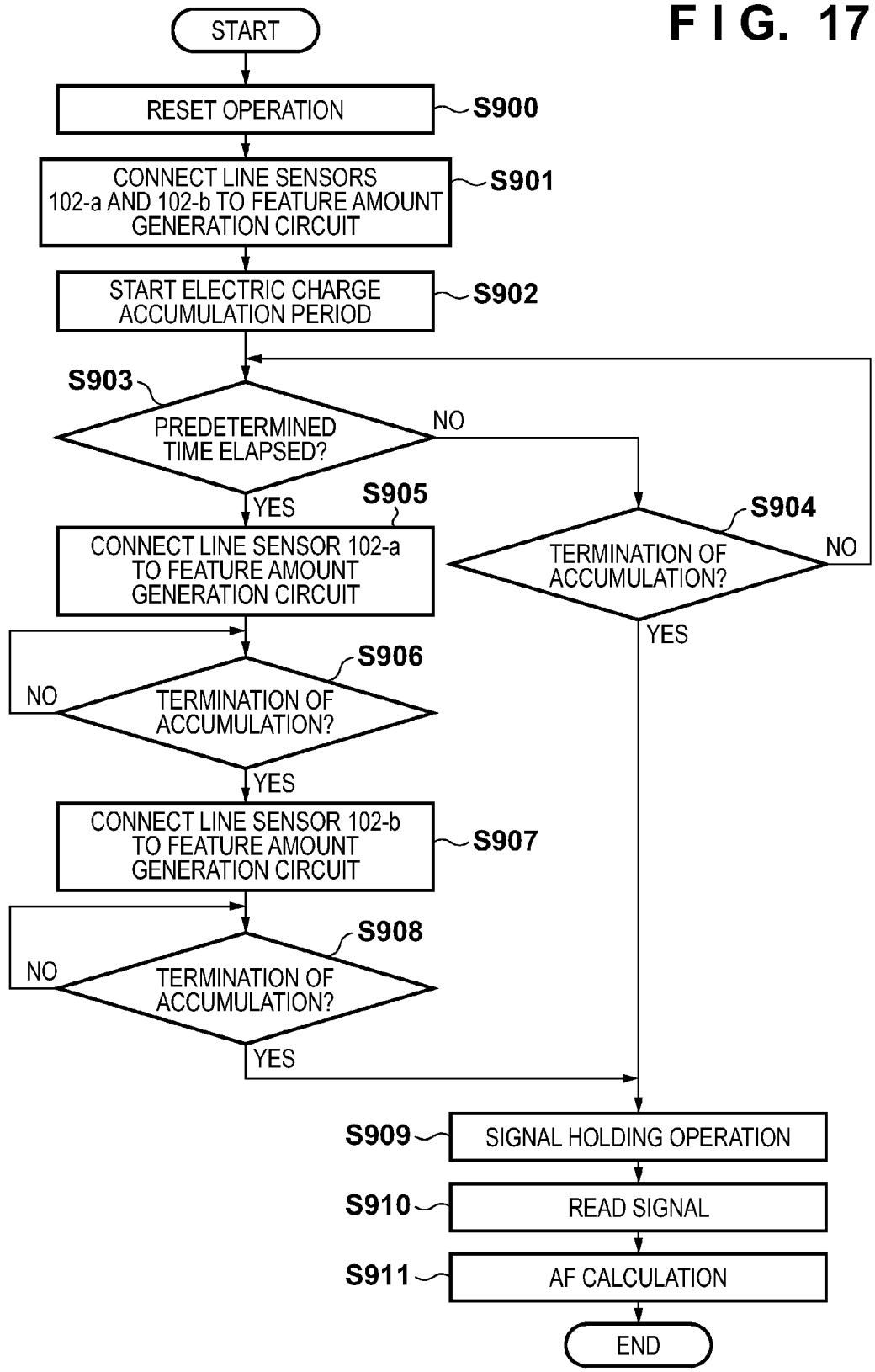
FIG. 17 is a flowchart of a focus detection operation according to the fourth embodiment.
Figures 19A, 19B, 19C:
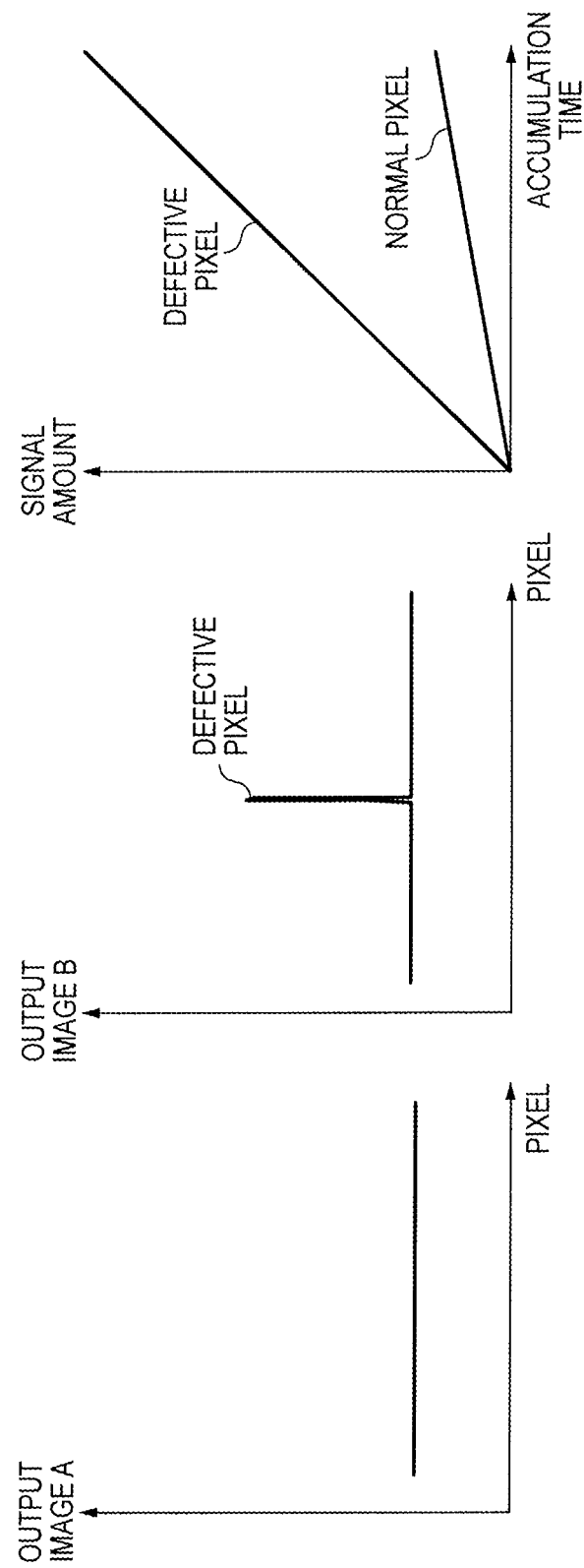
FIGS. 19A to 19C are graphs showing the signal of a defective pixel.
Figure 20:
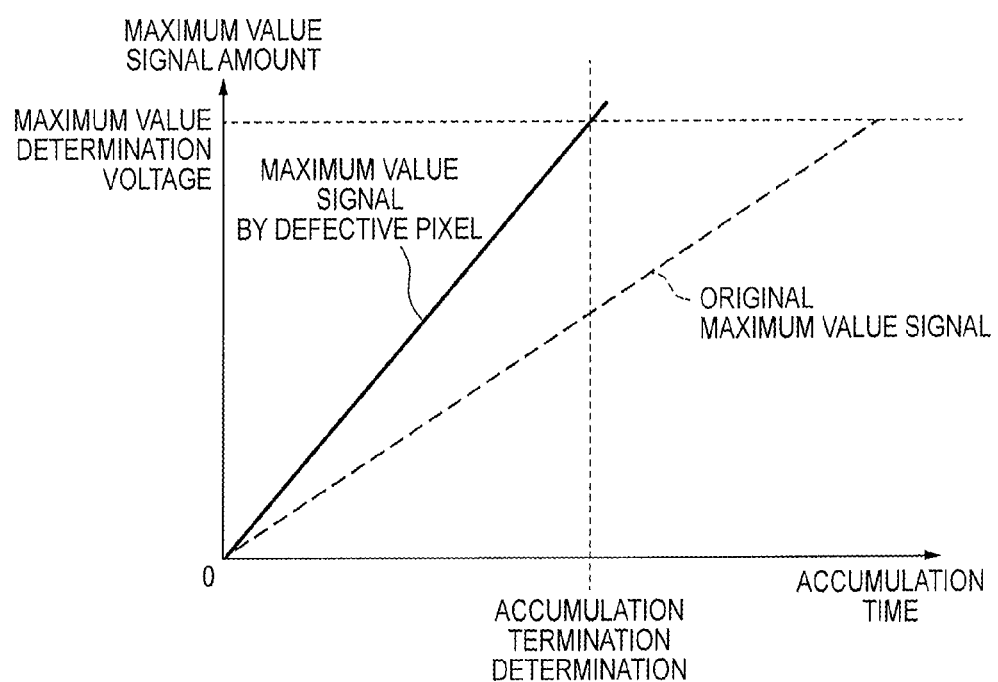
FIG. 20 is a graph showing the relationship between a defective pixel and accumulation control in related art.

The operation of the AF sensor 101 according to this embodiment will be described in detail with reference to the flowchart of FIG. 17. FIGS. 9A and 9B show the relationship between an object image and a defective pixel.

When a focus detection start signal is received by operating a switch group 214, the AF sensor 101 is controlled from a CPU 100, thereby starting the focus detection operation.

In step S900, the AF sensor 101 is controlled from the CPU 100, thereby resetting the line sensor 102.

In step S901, both the switch groups 103-*a* and 103-*b* are turned on, and both the signals from line sensors 102-*a* and 102-*b* are input to the feature amount generation circuit 104. The CPU 100 acquires information of defective pixels checked in the manufacturing step in advance from a storage circuit 209 and turns off the switches connected to the defective pixels so the defective pixels are not connected to the feature amount generation circuit 104.

In step S902, the electric charge accumulation period starts (accumulation start time). In step S903, the elapsed time of the accumulation period is measured and determined. If the accumulation period has not reached a predetermined time, the process advances to step S904. Accumulation termination determination is performed based on the difference signal PB41 generated by the subtraction circuit 41*c* from the maximum value MAX41 and the minimum value MIN41 of the signals from the line sensors 102-*a* and 102-*b*. If the accumulation termination determination is done in step S904, the process advances to step S909 to perform a signal holding operation.

If the accumulation termination determination is not performed in step S904, and a predetermined time has elapsed (second operation mode), the process advances to step S905 to turn off the switch group 103-*b* so that only the signal of the line sensor 102-*a* is input to the feature amount generation circuit 104. At this time, the difference signal PB41 represents the feature amount of the line sensor 102-*a*.

The process advances to step S906 to perform accumulation termination determination for the line sensor 102-*a*. When the accumulation termination determination is done, the process advances to step S907 to turn off the switch group 103-*a* and turn on the switch group 103-*b* so that only the signal of the line sensor 102-*b* is input to the feature amount generation circuit 104. At this time, the difference signal PB41 represents the feature amount of the line sensor 102-*b*.

The process advances to step S908 to perform accumulation termination determination for the line sensor 102-*b*. When the accumulation termination determination is done in step S908, the process advances to step S909 to perform a signal holding operation.

When the object is bright, the accumulation time is short, and the signal growth due to defects of pixels is small. For this reason, the influence of the defective pixels is small in accumulation time control. Hence, when the object is dark, and the accumulation time is long, the processing of steps S905 to S908 are performed to reduce the influence of the defective pixels. The processing of steps S905 to S908 is equivalent to generating a feature amount for each of the line sensors 102-*a* and 102-*b* and performing accumulation termination determination for each feature amount. It is therefore possible to obtain the same effect as in the first embodiment and perform appropriate accumulation control without the influence of a defective pixel existing in one of the line sensors.

As described above, when the object is dark and is affected by defective pixels, time-divisional driving is performed to reduce the influence of the defective pixels. When the object is bright, the signals of the line sensors 102-a and 102-b are composited to perform feature amount generation and accumulation termination determination. This makes it possible to prevent degradation in responsibility caused by time-divisional driving while suppressing the influence of the defective pixels. Additionally, in this embodiment, since one maximum value detection circuit, one minimum value detection circuit, and one subtraction circuit suffice, an increase in the circuit scale can also be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-021797, filed Feb. 6, 2013, which is hereby incorporated by reference herein in its entirety.

What is claimed is:

1. A focus detection apparatus comprising:
a sensor unit including a first sensor and a second sensor and configured to output a signal for focus detection using a phase difference detection method, each of said first sensor and said second sensor being configured to receive light that has passed through an imaging optical system and accumulate electric charges, wherein a defocus amount is determined based on a first signal corresponding to the electric charges accumulated in said first sensor and a second signal corresponding to the electric charges accumulated in said second sensor;
a signal generation unit configured to generate a predetermined signal based on a contrast of a signal input from the sensor unit; and
a control unit configured to control an accumulation operation of the electric charges in said first sensor and said second sensor based on a signal level of the predetermined signal,
wherein the control unit is configured to control the accumulation operation of the electric charges in said first sensor and said second sensor, based on a signal level of the predetermined signal generated based on a contrast of the first signal and a signal level of the predetermined signal generated based on a contrast of the second signal,
wherein when the signal level of the predetermined signal generated based on the first signal has reached a predetermined level and the signal level of the predetermined signal generated based on the second signal has reached a predetermined level, the control unit controls to terminate accumulation of the electric charges in the first sensor and the second sensor.

2. The apparatus according to claim 1, wherein the signal generation unit is configured to generate the predetermined signal by subtracting a minimum value from a maximum value of the signal input from the sensor unit.

3. The apparatus according to claim 1, wherein the signal generation unit is configured to generate the predetermined signal based on a signal obtained by composing the first signal and the second signal in a first mode, and generate the predetermined signal based on each of the first signal and the second signal in a second mode.

4. The apparatus according to claim 3, wherein when the control unit controls the accumulation operation of the electric charges in the first sensor and the second sensor based on the predetermined signal generated in the first mode, if a signal level of the predetermined signal obtained by composing the first signal and the second signal has reached a predetermined level, said control unit controls to terminate accumulation of the electric charges in said first sensor and said second sensor.

5. The apparatus according to claim 3, wherein in the second mode, said signal generation unit time-divisionally generates the first signal and the second signal.

6. The apparatus according to claim 3, wherein said control unit has not terminated accumulation of the electric charges in said first sensor and said second sensor based on the predetermined signal generated in the first mode until a predetermined time has passed from starting accumulation of the electric charges in said first sensor and said second sensor, said control unit controls the accumulation operation of the electric charges in said first sensor and said second sensor of the electric charges based on the predetermined signal generated in the second mode.

7. The apparatus according to claim 3, wherein when the control unit controls the accumulation operation of the electric charges in the first sensor and the second sensor based on the predetermined signal generated in the second mode, if the signal level of the predetermined signal generated based on the first signal has reached a predetermined level and the signal level of the predetermined signal generated based on the second signal has reached a predetermined level, the control unit controls to terminate accumulation of the electric charges in the first sensor and the second sensor.

8. The apparatus according to claim 3 further comprising:
a switching unit configured to switch inputting each of the first signal and the second signal to the signal generation unit.

9. The apparatus according to claim 8, wherein the switching unit inputs both the first signal and the second signal to the signal generation unit in the first mode, and inputs one of the first signal and the second signal to the signal generation unit in the second mode.

10. The apparatus according to claim 3, wherein the control unit controls the accumulation operation of the electric charges in said first sensor and said second sensor based on the predetermined signal generated in the first mode until a predetermined time has passed from starting accumulation of the electric charges in said first sensor and said second sensor.

11. A method of controlling a focus detection apparatus constituted by arranging a sensor unit including a first sensor and a second sensor and configured to output a signal for focus detection using a phase difference detection method, each of the first sensor and the second sensor being configured to receive light that has passed through an imaging optical system and accumulate electric charges, wherein a defocus amount is determined based on a first signal corresponding to the electric charges accumulated in said first sensor and a second signal corresponding to the electric charges accumulated in said second sensor, the method comprising:
generating a predetermined signal based on a contrast of a signal input from the sensor unit; and
controlling an accumulation operation of the electric charges in the first sensor and the second sensor based on a signal levels of the predetermined signal,
wherein the accumulation operation of the electric charges in said first sensor and said second sensor is controlled based on a signal level of the predetermined signal generated based on a contrast of the first signal and a signal level of the predetermined signal generated based on a contrast of the second signal, wherein when the signal level of the predetermined signal generated based on the first signal has reached a predetermined level and the signal level of the predetermined signal generated based on the second signal has reached a predetermined level, accumulation of the electric charges in the first sensor and the second sensor is terminated.

12. A focus detection apparatus comprising:
a sensor including a first sensor and a second sensor and configured to output a signal for focus detection using a phase difference detection method, each of said first sensor and said second sensor being configured to receive light that has passed through an imaging optical system and accumulate electric charges, wherein a defocus amount is determined based on a first signal corresponding to the electric charges accumulated in said first sensor and a second signal corresponding to the electric charges accumulated in said second sensor;
a signal generator circuit configured to generate a predetermined signal based on a contrast of a signal input from the sensor unit; and
a controller configured to control an accumulation operation of the electric charges in said first sensor and said second sensor based on a signal level of the predetermined signal,
wherein the controller is configured to control the accumulation operation of the electric charges in said first sensor and said second sensor, based on a signal level of the predetermined signal generated based on a contrast of the first signal and a signal level of the predetermined signal generated based on a contrast of the second,
wherein when the signal level of the predetermined signal generated based on the first signal has reached a predetermined level and the signal level of the predetermined signal generated based on the second signal has reached a predetermined level, the controller controls to terminate accumulation of the electric charges in the first sensor and the second sensor.

13. The apparatus according to claim 12, wherein the signal generator circuit is configured to generate the predetermined signal by subtracting a minimum value from a maximum value of the signal input from the sensor.

14. The apparatus according to claim 12, wherein the signal generator circuit is configured to generate the predetermined signal based on a signal obtained by composing the first signal and the second signal in a first mode, and generate the predetermined signal based on each of the first signal and the second signal in a second mode.

15. The apparatus according to claim 14, wherein when the controller controls the accumulation operation of the electric charges in the first sensor and the second sensor based on the predetermined signal generated in the first mode, if a signal level of the predetermined signal obtained by composing the first signal and the second signal has reached a predetermined level, said controller controls to terminate accumulation of the electric charges in said first sensor and said second sensor.

16. The apparatus according to claim 14, wherein in the second mode, said signal generator circuit time-divisionally generates the first signal and the second signal.

17. The apparatus according to claim 14, wherein said controller has not terminated accumulation of the electric charges in said first sensor and said second sensor based on the predetermined signal generated in the first mode until a predetermined time has passed from starting accumulation of the electric charges in said first sensor and said second sensor, said controller controls the accumulation operation of the electric charges in said first sensor and said second sensor of the electric charges based on the predetermined signal generated in the second mode.

18. The apparatus according to claim 14, wherein when the controller controls the accumulation operation of the electric charges in the first sensor and the second sensor based on the predetermined signal generated in the second mode, if the signal level of the predetermined signal generated based on the first signal has reached a predetermined level and the signal level of the predetermined signal generated based on the second signal has reached a predetermined level, the controller controls to terminate accumulation of the electric charges in the first sensor and the second sensor.

19. The apparatus according to claim 14 further comprising:
a switch configured to switch inputting each of the first signal and the second signal to the signal generator circuit.

20. The apparatus according to claim 19, wherein the switch inputs both the first signal and the second signal to the signal generator circuit in the first mode, and inputs one of the first signal and the second signal to the signal generator circuit in the second mode.

21. The apparatus according to claim 14, wherein the controller controls the accumulation operation of the electric charges in said first sensor and said second sensor based on the predetermined signal generated in the first mode until a predetermined time has passed from starting accumulation of the electric charges in said first sensor and said second sensor.

22. A method of controlling a focus detection apparatus constituted by arranging a sensor including a first sensor and a second sensor and configured to output a signal for focus detection using a phase difference detection method, each of the first sensor and the second sensor being configured to receive light that has passed through an imaging optical system and accumulate electric charges, wherein a defocus amount is determined based on a first signal corresponding to the electric charges accumulated in said first sensor and a second signal corresponding to the electric charges accumulated in said second sensor, the method comprising:
generating a predetermined signal based on a contrast of a signal input from the sensor; and
controlling an accumulation operation of the electric charges in the first sensor and the second sensor based on a signal level of the predetermined signal,
wherein the accumulation operation of the electric charges in said first sensor and said second sensor is controlled based on a signal level of the predetermined signal generated based on a contrast of the first signal and a signal level of the predetermined signal generated based on a contrast of the second signal,
wherein when the signal level of the predetermined signal generated based on the first signal has reached a predetermined level and the signal level of the predetermined signal generated based on the second signal has reached a predetermined level, accumulation of the electric charges in the first sensor and the second sensor is terminated.

* * * * *